Sept. 16, 1952     L. W. POLLOCK     2,610,703
CONTINUOUS ADSORPTION PROCESS
Filed July 8, 1946
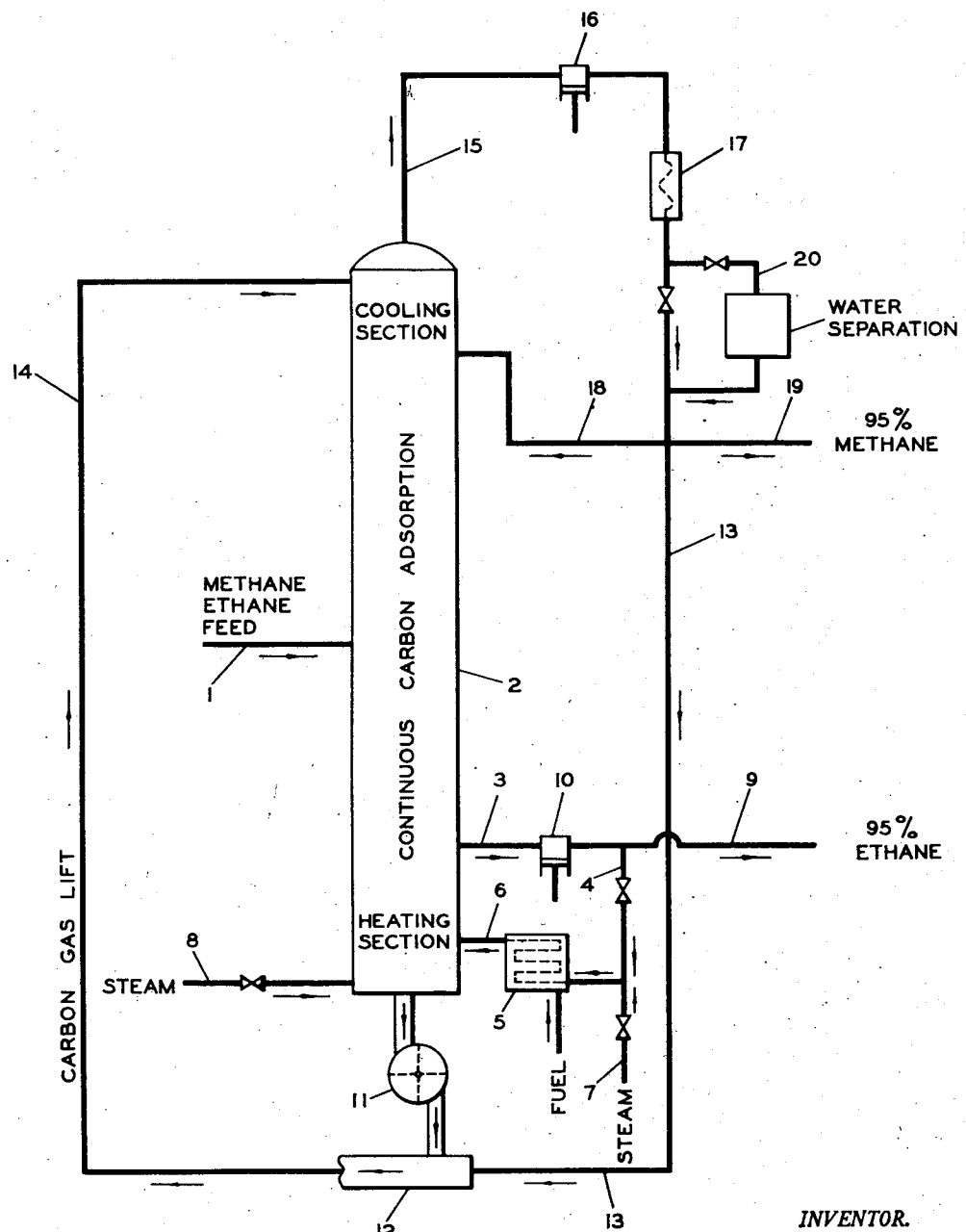
INVENTOR.
L.W. POLLOCK
BY
*Hudson and Young*
ATTORNEYS Patented Sept. 16, 1952

2,610,703

UNITED STATES PATENT OFFICE 2,610,703

CONTINUOUS ADSORPTION PROCESS

Lyle W. Pollock, Washougal, Wash., assignor to Phillips Petroleum Company, a corporation of Delaware Application July 8, 1946, Serial No. 681,781

3 Claims. (Cl. 183—114.2)

This invention relates to a continuous adsorption process which may be employed for the separation of low-boiling gases. It is particularly suitable for the separation of normally gaseous hydrocarbons from one another, especially the paraffin hydrocarbons ranging from methane to butanes and the olefins ranging from ethylene to butylene. The process of the present invention is very valuable for the separation of methane (or hydrogen and methane) from ethane (and any heavier). It may be used for the separation of ethane from propane or even for the separation of propane from butane although it would ordinarily be more feasible to separate propane from butane by other methods such as fractional distillation. My invention has particular application to those separations which require the use of expensive refrigeration methods to provide reflux when fractional distillation is employed. It is obviously much less costly to use ordinary plant cooling water than to employ refrigeration or high pressure or both in order to liquefy the overhead product to provide the necessary liquid reflux required for fractional distillation methods.

The process of my invention may also be applied to effect the recovery of ethylene from gases containing same for example to separate hydrogen and methane from ethylene. It might also be used to separate ethylene from heavier materials such as propane or propylene. It may be used to separate $C_2$ hydrocarbons (ethylene and ethane) from either lighter or heavier material. The separation of a concentrated ethylene from cracked gas by a process involving adsorption is disclosed and claimed in the copending application of R. S. Ogilvie, Serial No. 657,011, filed March 25, 1946.

My process may be employed to effect separation of low-boiling gases broadly, as to separate hydrogen from methane. It may even be used to separate nitrogen from methane. An adsorption method of separating nitrogen from natural gas is disclosed and claimed in the copending application of George Thodos, Serial No. 662,152, filed April 15, 1946.

In order to separate low-boiling gases by distillation, it is necessary to operate the distillation column below the critical temperature of the products produced. For example, in separating methane from ethane by distillation, it is necessary to operate the tower with a top temperature below the critical temperature of methane which is —115.8° F. The critical pressure of methane is about 673 pounds. The reflux for a column operating at such low temperatures is usually furnished by refrigeration. The present invention provides a process whereby low-boiling gases may be separated at a temperature level where water can be used for cooling.

The principal object of the present invention is to provide an improved process for separating low-boiling gases. Another object is to provide such a process for the separation of light hydrocarbons. Another object is to provide such a process for the separation of methane from ethane. Another object is to provide a process of the foregoing type which enables the separation to be accomplished without resorting to extremely low temperatures. Numerous other objects will hereinafter appear.

The accompanying drawing portrays diagrammatically one arrangement of equipment which may advantageously be employed for carrying out the process of the present invention.

In the process of my invention low-boiling gases are separated continuously in an adsorption tower by selective adsorption on activated carbon or other selective adsorbent. The required cooling of the adsorbent at the top of the tower is obtained by recycling part of the overhead gaseous fraction through a cooler and back to the cooling section in the tower. The adsorbed vapors are desorbed from the adsorbent at the bottom of the tower in a heating section of the tower in which open steam may be used to improve desorption. The heat of desorption and sensible heat added to the adsorbent is preferably supplied by recycling a portion of the gaseous fraction from the bottom of the tower through a heater and returning the thus-heated gaseous fraction to the tower. The open steam used in the bottom of the tower may be superheated also to furnish all or part of the required heat.

In a typical aspect, my invention may be said to be a process for the separation of low-boiling gases which comprises continuously feeding a stream of the gases to be separated to a vertical continuously downwardly moving bed of solid granular adsorbent which is capable of selectively adsorbing at least one component of said stream preferentially with respect to at least one other component thereof, effecting the introduction of said gaseous stream at an intermediate point of said bed, causing said gaseous stream to countercurrently contact the adsorbent, maintaining such conditions that said adsorbent selectively adsorbs at least one of the components of said stream and allows the remainder of said stream to pass on unadsorbed through the bed, heating the bottom portion of said bed to effect desorption of the adsorbed gas, continuously withdrawing the desorbed gaseous fraction from the bottom of the bed, continuously withdrawing the desorbed adsorbent from the bottom of said bed and recycling same to the top of said bed, continuously withdrawing the unadsorbed overhead gaseous fraction from the top of the bed, cooling at least a portion of said overhead gaseous fraction, and continuously introducing at least a portion of the cooled overhead gaseous fraction directly into the top of the bed to cool the same.

In the preferred practice of my invention, a mixture of low-boiling hydrocarbon gases is separated by means of a moving bed of granular activated carbon. Typical examples are the separation of methane from ethane, ethane from propane and the separation of hydrogen and methane from heavier hydrocarbons as typified by the treatment of ethylene-containing cracked gas to separate the ethylene-rich $C_2$ fraction from the lighter components.

An essential feature of my invention is the maintenance of the necessary low temperature in the top of the moving bed by the direct introduction of a suitably cooled portion of the unadsorbed overhead fraction.

I have found it also very desirable to employ another cooled portion of the overhead fraction to lift the adsorbent withdrawn continuously from the bottom of the moving bed to the top. This functions not only as a gas lift for the adsorbent but also to cool the recycled adsorbent and thus additionally aids in the maintenance of the low temperature at the top of the tower.

The top and bottom temperatures maintained may vary within wide limits and suitable values therefor may readily be selected by those skilled in the art. The particular values employed will depend upon many other factors such as degree of separation desired, the particular gases being resolved, the rate of flow of the adsorbent, the type of adsorbent, the gas pressure in the adsorber, etc. The proper interrelation of the several conditions may readily be effected by those skilled in the art.

In separating methane from ethane at a pressure of 150 pounds per square inch absolute in accordance with my invention, a very suitable top temperature is 100° F. and a satisfactory bottom temperature is 500° F.

The top temperature may vary over wide limits, but is preferably such that ordinary cooling water will suffice to effect the desired temperature control whereby expensive refrigeration is not required. Generally, the top temperature will be maintained within the range of from 90 to 120° F. The bottom temperature may range from 200 to 500° F. No temperature differential is necessary to effect the separation, heating being necessary only to accomplish desorption of the adsorbent.

The pressure may conveniently range from atmospheric to 150 pounds per square inch absolute. Use of pressure below atmospheric is generally not feasible. Use of pressure in excess of 150 pounds per square inch is likewise undesirable because of excessive compression requirements. The desorption temperature and the pressure are correlated for best results. For example at the lower pressures in the range given, say at pressures of from atmospheric to 30 pounds per square inch absolute, the bottom temperature of the bed may advantageously be maintained in the lower portion of the range of from 200 to 500° F., say at from 200 to 240° F.

The rate at which the adsorbent is fed through the unit will likewise vary widely depending upon the other conditions of operation, but likewise may be readily fixed by those skilled in the art. Typical rates may range from 10,000 to 100,000 pounds per hour for 100 mols of feed per hour. Obviously the lower this rate the more economical is the operation. It is desirable that conditions of temperature and pressure be such that the rate of adsorbent feed is as low as possible.

As the adsorbent I almost invariably use granular activated carbon, especially the type which is characterized by high gas-adsorptive ability. Activated charcoal is a very desirable type of activated carbon. Instead of activated carbon, although less preferably, I may use other adsorbents such as silica gel, or the like.

In the drawing, the mixture of gases to be separated, such as a mixture of methane and ethane, enters the system via line 1 and is fed into continuous carbon adsorber 2 at an intermediate point therein which is generally at or near the mid-point. The gases rise in the upper or adsorbing portion of unit 2, countercurrently contacting the carbon column descending therein. The carbon selectively adsorbs the ethane and some methane and passes into the lower or rectifying section. As the activated carbon approaches the heating section, the less strongly adsorbed methane is displaced by ethane and passes upwardly into the adsorber unit while desorbed ethane is stripped from the charcoal as bottoms product. The stripped bottoms product is withdrawn via line 3 and a suitable portion thereof is passed via line 4 to heater 5 where it is heated to a suitable temperature, whereupon it is injected into the bottom of unit 2. Steam may be introduced via line 7 into the stream of bottoms product passing to heater 5 and any steam so introduced is superheated before injection into unit 2. Steam from any source may be injected via line 8 directly into the bottom of tower 2. The balance of the bottoms product, in this case 95 per cent ethane, is withdrawn via line 9. Line 3 takes off at any suitable vertical position in tower 2, this position being readily determinable by calculation or experiment and usually being located a substantial distance above the point at which line 6 enters. A compressor 10 is shown in line 3. This compressor may be located in line 4, if desired, and serves to impart the necessary additional pressure required for re-injection of the bottoms product.

Stripped carbon adsorbent is withdrawn continuously from the bottom of unit 2 in any suitable manner which maintains the gas seal. This may be accomplished by means 11 which may be a so-called star or barrel valve. The withdrawn carbon may be elevated to the top of the unit 2 in any suitable manner but it is highly preferred to employ a gas lift using a current of cooled overhead vapor as the lifting medium. Thus the withdrawn carbon may be dropped into a gas lift indicated by the section of pipe 12 into which the stream of cooled gaseous overhead is continuously injected via line 13. The gas lift is not fully depicted but the remainder of it is indicated by line 14. It directs the carbon into the top of the unit 2 in any suitable manner.

The unadsorbed gaseous fraction leaves the top of unit 2 via line 15 whence it may pass through compressor 16 to cooler 17 where it is cooled in any suitable manner. The required cooling of the adsorbent carbon at the top of the tower is obtained by recycling part of the cooled overhead product via line 18 directly into the top of unit 2. Compressor 16 supplies the pressure required for the re-injection. Another portion of the cooled overhead product is passed via line 13 for cooling and lifting the carbon withdrawn from the bottom of unit 2. The balance of the overhead product may be withdrawn from the system via line 19. If it is desired to reduce the cost of operation product takeoff line 19 may connect to line 15 whereby compressing and cooling of this stream is eliminated.

The injection of open steam into the bottom of unit 2 may, depending upon the amount of steam introduced, necessitate a water separation step 20 following the cooling step applied to the overhead product, in order to effect separation of the condensed water.

The open steam introduced via line 6 may or may not be superheated. If it is not superheated, then enough bottom product heated to a sufficiently high temperature to superheat it should be introduced via line 6. The steam fed in via line 7 will usually not be superheated. The steam fed via line 7 and superheated in heater 5 may furnish all or only a part of the heat required for desorption and to supply the sensible heat added to the carbon.

*Example*

Using equipment of the type portrayed in the drawing, a feed stream consisting of methane and ethane in a 60:40 mol ratio is fed via line 1 to a continuous activated charcoal adsorption unit 2. The unit 2 is operated under a pressure of about 150 pounds per square inch absolute with a temperature of 100° F. at the top and 500° F. at the bottom. The feed rate is 100 mols per hour. The rate of charcoal circulation is 18,000 pounds per hour. The top is cooled by cooling and recycling directly a portion of the overhead gas and another portion of the cooled overhead gas is used to operate the gas lift for the charcoal and at the same time cool the recycled charcoal. The balance of the overhead is withdrawn and is 95 per cent methane. A portion of the bottoms product, comprising 95 per cent ethane is admixed with steam and heated to a temperature of 500° F. and the hot mixture injected directly into the bottom of the moving bed to effect the desorption.

Many advantages of the process of my invention will be apparent to those skilled in the art. One of the most important advantages is that the problem of heat transfer in cooling the top section and heating the bottom section of the moving adsorbent bed is completely solved in a simple and economical manner. It will be obvious that it is very difficult to cool the top of the bed by indirect cooling means such as cooling coils arranged in the top of the bed, because of the very poor transfer of heat from the relatively non-heat-conductive adsorbent to the cooling coils with the result that it is almost impossible to obtain rapid cooling and uniform temperature throughout the top of the bed. In my invention this difficulty is overcome since I simply cool the overhead gas itself which is fairly easy to accomplish in an outside cooling tower and inject this cold gas directly into contact with the body of adsorbent, thereby attaining excellent temperature control in all parts of the top of the bed. Since I use cooled overhead gas, no problem of dilution or contamination with the cooling agent arises. I use another portion of cooled overhead gas as the gas lifting medium and this is similarly highly advantageous.

Similar advantages accure from the preferred embodiment of my invention wherein a portion of the bottoms product is heated and injected into the bottom or stripping section of the moving bed as a direct heating medium for accomplishing desorption of the adsorbent. Here again there is no contamination with an extraneous heating medium and the advantages of direct contact of the heating medium with all portions of the adsorbent in the bottom section of the moving bed are obtained. I find it highly advantageous to use open steam as an auxiliary stripping medium in the bottom of the moving bed. Steam improves the stripping and appears to reduce the clogging of the adsorbent with heavy material and thereby lessens the need for regeneration. It will be understood that it may be necessary intermittently or continuously to pass a portion of the adsorbent in the system to a regeneration unit where it is subjected to revivification and/or reactivation, in order to keep the adsorbent in the system at a suitably high level of activity.

I claim:

1. A process for the separation of a mixture of low-boiling hydrocarbon gases comprising maintaining a gravitating elongated column of granular activated charcoal of uniform horizontal cross-section; contacting the intermediate section of said column of charcoal with a countercurrent stream of the low-boiling hydrocarbon mixture to be separated so as to selectively adsorb the higher molecular weight hydrocarbon and allow the residual hydrocarbon to pass upwardly through the remainder of the bed; withdrawing a stream of residual hydrocarbon from the upper end of said column; contacting the lower section of said column of charcoal containing the adsorbed hydrocarbon with a hot gaseous stream comprising recycled desorbed hydrocarbon together with steam so as to desorb the adsorbed hydrocarbon, said gaseous stream supplying by direct heat exchange all of the heat for the desorption step; recovering a stream of desorbed hydrocarbon from the upper end of said lower section, heating a portion thereof, and recycling same to said lower section as a portion of said gaseous stream; maintaining a cooling section in the upper end of said column of charcoal solely by recycling a cooled portion of the unadsorbed hydrocarbon in direct heat exchange with the charcoal therein; and recycling charcoal from the lower end of said column to the top thereof.

2. The process of claim 1 in which feed to the intermediate section of the column comprises essentially methane and ethane, the ethane being recovered from the lower section of the column and the methane being recovered from the upper section of the column.

3. The process of claim 1 in which the feed to the intermediate section of the column comprises essentially a mixture of hydrogen, methane, and heavier low-boiling hydrocarbons, the methane and hydrogen passing overhead and the heavier low-boiling hydrocarbons being adsorbed and recovered from the lower section of said column.

LYLE W. POLLOCK.

REFERENCES CITED

The following references are of record in the file of this patent:

UNITED STATES PATENTS

| Number | Name | Date |
|---|---|---|
| 1,422,007 | Soddy | July 4, 1922 |
| 1,825,707 | Wagner, Jr. | Oct. 6, 1931 |
| 1,836,301 | Bechthold | Dec. 15, 1931 |
| 1,872,080 | Harris | Aug. 16, 1932 |
| 2,354,383 | Kiesskalt | July 25, 1944 |

FOREIGN PATENTS

| Number | Country | Date |
|---|---|---|
| 317,629 | Great Britain | Aug. 22, 1929 |